United States Patent [19]

Wallace

[11] 4,140,836
[45] Feb. 20, 1979

[54] AQUEOUS ACRYLIC-CARBOXYLATED POLYETHER COATING COMPOSITIONS

[75] Inventor: David R. Wallace, Pittsburgh, Pa.

[73] Assignee: PPG Industries, Inc., Pittsburgh, Pa.

[21] Appl. No.: 884,334

[22] Filed: Mar. 7, 1978

Related U.S. Application Data

[62] Division of Ser. No. 634,005, Nov. 20, 1975, Pat. No. 4,098,740.

[51] Int. Cl.² .................. B32B 15/08; B32B 27/08
[52] U.S. Cl. .................. 428/463; 260/29.6 NR; 260/29.2 EP; 260/42.28; 427/386; 427/388 C; 427/410; 428/520
[58] Field of Search ............... 260/29.6 NR, 29.6 EP; 428/463; 427/386, 388 C

[56] References Cited

U.S. PATENT DOCUMENTS

| | | | |
|---|---|---|---|
| 3,403,088 | 9/1968 | Hart | 204/181 |
| 3,960,795 | 6/1976 | Dowbenko et al. | 260/29.2 EP |

*Primary Examiner*—Carman J. Seccuro
*Attorney, Agent, or Firm*—William J. Uhl

[57] ABSTRACT

An aqueous composition useful for forming primer coatings for adhering high molecular weight emulsion polymerized acrylic polymers to metallic substrates is disclosed. The aqueous dispersion comprises a mixture of:

(A) a high molecular weight water-insoluble acrylic latex;
(B) a carboxylated polyether formed from reacting and then hydrolyzing
  (1) a polyepoxide having a epoxide equivalency greater than 1,
  (2) a compound containing at least one phenolic hydroxyl group and containing at least one group hydrolyzable to a carboxyl group.

7 Claims, No Drawings

AQUEOUS ACRYLIC-CARBOXYLATED POLYETHER COATING COMPOSITIONS

CROSS-REFERENCE TO RELATED APPLICATIONS

This is a division of application Ser. No. 634,005, filed Nov. 20, 1975, now U.S. Pat. No. 4,098,740.

U.S. Pat. No. 3,960,795 discloses aqueous coating compositions formed by reacting an epoxy-containing organic material with a compound containing at least one phenolic hydroxyl group and a group hydrolyzable to a carboxyl group. The resultant products may then be hydrolyzed using hydrolyzing agents such as aqueous potassium hydroxide. It is also disclosed in this patent application that the aforementioned described compositions may contain low molecular weight water-soluble acrylic polymers.

BACKGROUND OF THE INVENTION

1. Field of the Invention

This invention relates broadly to film-forming compositions and more particularly to primer compositions. In another aspect, this invention relates to aqueous compositions useful for forming primer coatings for binding high molecular weight emulsion polymerized acrylic polymers to metallic substrates such as galvanized steel.

2. Brief Description of the Prior Art

Coil coating involves the application of a coating composition to continuous strips of a metallic substrate, usually aluminum or steel. The metal is of relatively light gauge and comes to the coating operation in the form of coils from which it is unwound and continuously coated. After coating, the coil passes into a baking or curing oven where it is cured at relatively high temperature for a relatively short period of time. The coated article is then passed to further operations where it is fabricated into desirable shapes such as for home and industrial siding as well as automotive and appliance parts. Compositions for coil coating must be carefully selected because the curing or baking conditions are rigorous. The high temperatures used result in water popping which evidences itself by bubbles or pinholes appearing in the cured film surface. Water popping is observed with many water-soluble coating compositions such as low molecular weight water-soluble acrylics cured with an aminoplast resin. Although the exact cause of water popping is not known with certainty, it is believed that the film begins to cure or crosslink before the last portion of water is eliminated. This residual water cannot diffuse through the tough surface film and collects there as tiny bubbles.

In attempts to overcome the problems of water popping, attempts have been made to use high molecular weight thermoplastic acrylic latices instead of low molecular weight water-soluble acrylics and curing agent. The high molecular weight thermoplastic acrylics do not require crosslinking to develop good coating properties. Unfortunately, these higher molecular weight materials must be prepared and stabilized with one or more emulsifying agents. The emulsifying agent can find its way into the resultant coating where it can sensitize the resultant coating to moisture. The moisture penetrates the film and reduces the adhesion between the film and the metal surface and eventually corrodes the metal surface. This problem is particularly acute with galvanized steel substrates where adhesion between the high molecular weight acrylics and the galvanized steel quickly deteriorates.

In attempts to overcome moisture penetration of these high molecular weight acrylic films, I have experimented with various primer coatings to be applied between the metal surface and the high molecular weight thermoplastic acrylic topcoat. One particular class of coating materials which I have found to provide an excellent moisture barrier to the metal surface are carboxylated polyethers which are described in the aforementioned U.S. Pat. No. 3,960,795. Unfortunately, these materials by themselves do not provide sufficient interfacial adhesion between the primer coat and the high molecular weight thermoplastic acrylic topcoat for commercial applications. However, I have found that if the carboxylated polyethers are blended with high molecular weight water-insoluble acrylic latices such as the type used in the topcoat formulations in specified proportions, commercially acceptable adhesion can be developed while maintaining the good moisture barrier properties of the carboxylated polyethers.

Somewhat surprisingly, the combination of the carboxylated polyethers and the low molecular weight water-soluble acrylics cured with aminoplast does not provide commercially acceptable intercoat adhesion with the high molecular weight thermoplastic acrylic topcoats.

SUMMARY OF THE INVENTION

In accordance with the present invention, a method of producing a multiple layer coating on a substrate is provided. The method comprises:
(A) depositing on a substrate a film of a primer formed from an aqueous composition comprising a mixture of:
  (1) a water-borne acrylic polymer latex in which the acrylic polymer has a molecular weight of at least 250,000 on a weight average basis;
  (2) a carboxylated polyether formed from reacting and then hydrolyzing;
    (a) a polyepoxide having an epoxide equivalency greater than 1.0,
    (b) a compound containing at least one phenolic hydroxyl group and containing at least one group hydrolyzable to a carboxyl group;
(B) drying said primer film;
(C) applying over said primer a superimposed topcoat composition.

DETAILED DESCRIPTION

The high molecular weight water-insoluble acrylic polymer is a copolymerized latex product secured by emulsion polymerization in aqueous medium of vinyl and equivalently-reactive unsaturated monomers identified below.

A class of unsaturated monomeric materials which is used in preparing the high molecular weight acrylic polymers of the invention are esters of organic acids having terminal methylene groups and which constitute from 35 to 100, preferably 35 to 85 percent by weight of the total monomer charge. Examples of such esters include 4-15 carbon alkyl acrylates and 5-15 carbon alkyl methacrylates which are the preferred esters. Specific examples of suitable unsaturated monomers of this type include methyl methacrylate, ethyl methacrylate, propyl methacrylate, butyl methacrylate, amyl methacrylate, hexyl methacrylate, heptyl methacrylate, octyl methacrylate, decyl methacrylate, methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethylhexyl acrylate, decyl acrylate and dodecyl acrylate. Examples of other unsaturated esters containing terminal methylene groups which may be employed, although not being as preferred as the esters mentioned immediately above, are as follows: vinyl acetate, vinyl propionate, vinyl butyrate, vinyl isobutyrate, vinyl valerate, vinyl caproate, vinyl enanthate, vinyl benzoate, vinyl toluate, vinyl-para-chlorobenzoate, vinyl-ortho-chlorobenzoate, and similar vinyl halobenzoates. Usually, when these latter mentioned vinyl esters are employed, they are used in combination with the preferred acrylates and methacrylates.

A second class of materials which can be used in preparing the acrylic polymer are unsaturated carboxylic acids which constitute from about 0 to 10 and preferably 2 to 5 percent by weight of the monomer charge used in preparing the acrylic polymer. Examples of unsaturated carboxylic acids are those containing up to 10 carbon atoms such as acrylic acid and alkyl-substituted acrylic acid wherein the alkyl substituents constitute from 1 to 7 carbon atoms and may be aliphatic or cycloaliphatic in nature. Examples of suitable alkyl-substituted acrylic acids are methacrylic acid and ethacrylic acid. Examples of other suitable unsaturated acids which are not as preferred as the acrylic and substituted acrylic acids are unsaturated acids such as crotonic acid, maleic acid or its anhydride, fumaric acid or itaconic acid. Usually when these latter acids are used, they are employed in combination with the acrylic or methacrylic acids.

A third class of unsaturated monomeric materials which can be employed in preparing the acrylic polymers of the invention constitute copolymerizable monomeric materials containing a $CH_2=C<$ group in the terminal position other than the acids and esters mentioned above, and which constitutes from 0 to 60, preferably 10 to 60 percent by weight of the monomer charge used in preparing the acrylic polymer. Examples of these materials include styrene, alpha-methylstyrene, alpha-chlorostyrene, allyl chloride, methyl-alpha-chloroacrylate methyl-alpha-cyanoacrylate, dimethyl maleate acrylonitrile, acrylamide, N,N-dimethyl acrylamide, vinyl toluene and divinyl benzene.

The high molecular weight water-insoluble acrylic latexes can be made by dispersing in water the polymerizable carboxylic acid and the copolymerizable esters or monomers or at least a portion of them. The selected materials are dispersed to the desired monomer solids content by using surface-active water-soluble anionic or non-ionic dispersing agents. Also, mixtures of anionic and non-ionic dispersing agents may be used.

Examples of anionic emulsifiers that may be used include ordinary soaps such as the alkali metal, ammonium and alkanol amine salts of fatty acids including sodium oleate, potassium palmitate, ammonium stearate, ethanolamine laurate. Also, the synthetic saponaceous materials including the higher aliphatic sulfates and sulfonates such as sodium lauryl sulfate which is preferred and sodium cetyl sulfate may be employed. Examples of less preferred anionic emulsifiers which may be used include the sodium salts of sulfonated paraffin oils such as sodium oil sulfate, the sodium salts of dodecane-1-sulfonic acid, octadecane-1-sulfonic acid; the sodium alkyl aryl sulfonates such as sodium isopropylbenzene sulfonate sodium isopropylnaphthalene sulfonate; the alkali metal salts of sulfonated dicarboxylic acid esters and amides such as sodium dioctyl sulfo-succinate, sodium N-octadecyl-sulfonsuccinamide; sulfonated or sulfated alkyl phenoxyethoxyethanols having from 1 to 50 oxyethylene units per molecule in which the alkyl group has from 4 to 18 carbon atoms, such as hexy, n-octyl, t-octyl, lauryl, hexadecyl and octadecyl. Also, mixtures of anionic emulsifiers may be used.

Suitable non-ionic emulsifying and dispersion agents include alkylphenoxypolyethoxyethanols having alkyl groups of about 7 to 18 carbon atoms and 6 to 60 or more oxyethylene units, such as heptylphenoxypolyethoxyethanols, octylphenoxypolyethoxyethanols, nonylphenoxypolyethoxyethanols and dodecylphenoxypolyethoxyethanols; sulfur-containing agents such as those made by condensing 6 to 60 or more moles of ethylene oxide with nonyl, dodecyl, tetradecyl, t-dodecyl and the like mercaptans or with alkyl thiophenols having alkyl groups of from 6 to 15 carbon atoms; ethylene oxide derivatives of long-chain carboxylic acids such as lauric, myristic, palmitic, oleic; analogous ethylene oxide condensates of long-chain alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing 6 to 60 oxyethylene units; also ethylene oxide condensates of long-chain or branch-chain amines such as dodecylamine, hexadecylamine and octadecylamine, containing 6 to 60 oxyethylene groups; block copolymers of ethylene oxide and propylene oxide comprising a hydrophobic propylene oxide section combined with one or more hydrophilic ethylene oxide sections. Also, mixtures of non-ionic emulsifiers may be used.

The amount of emulsifier or emulsifiers required varies primarily with the concentration of monomers in the aqueous medium and to an extent with a choice of emulsifier, monomers and proportions of monomer. Generally, the amount of emulsifying agent is between 0.5 and 12 percent the weight of mixture of monomers and is preferably 0.5 to 4 percent of this weight; the percentage by weight being based on total monomer weight.

Preferably, a fractional part of the monomer mixture is emulsified in the aqueous medium and a free radical polymerizing catalyst added to the emulsion. The catalyst alone can be of the peroxide type and if the redox conditions are desired, then reducing actuators or agents and/or metal promoters can be included. The polymerization is then effected, preferably by gradually adding the residue of the monomer mixture at a rate which enables the operator to control and to keep the temperature of the mass within his selected operating range.

As the polymerization catalyst, there may be used one or more peroxides which are known to act as free radical catalysts and which are soluble in the aqueous medium. Examples include the persulfates, such as ammonium, sodium and potassium persulfates. Also, oil-soluble catalyst may be employed either alone or in addition to the water-soluble catalyst. Typical oil-soluble catalyst include organic peroxides, such as benzoyl peroxide, tertiary-butyl hydroperoxide, cumene peroxide, tetralin peroxide, acetyl peroxide, caproyl peroxide, tertiary-butyl perbenzoate, tertiary-butyl diperphthalate and methyl ethyl ketone peroxide. The preferred organic peroxides have at least partial solubility in the aqueous medium containing the emulsifying agent. The choice of inorganic or organic peroxide catalyst depends in part upon the particular combination of monomers to be interpolymerized, some of these responding better to one type than another.

The amount of peroxide catalyst required is roughly proportional to the concentration of the mixture of monomers. The usual range is 0.01 to 3, preferably 0.05 to 1 percent of the catalyst based on the weight of the monomer mixture. The optimum amount of catalyst is determined in large parts by the nature of the particular monomer selected including impurities which accompany particular monomers.

In order to effect interpolymerization at a temperature below that at which coagulation might occur, it is sometimes desirable to activate the catalyst. This may best be accomplished by using a so-called redox system in which a reducing agent is present in addition to a peroxide catalyst. A redox system can be used advantageously to secure improved physical and/or chemical characteristics in the resulting polymer, to secure higher molecular weight, to promote interpolymerization and to reduce coagulum which sometimes is produced when using non-ionic or other surfactants at high temperature. Many examples of such systems are known. Agents such as hydrazine or soluble sulfite, including hydrosulfites, sulfoxylates, thiosulfates, sulfites, and bisulfites can be used. Examples of these are sodium hydrosulfite, sodium metabisulfite, potassium sulfite, zinc formaldehyde-sulfoxylate, and calcium bisulfite. Redox systems may be activated by the presence of small amounts of polyvalent metal ions. Ferrous ions are commonly and effectively thus used (for example, ferrous sulfate), a few parts per million being sufficient. The peroxide catalyst can also be activated by the presence of a tertiary amine which is soluble in the reaction medium such as dimethylethanolamine or triethanolamine. Also, mixtures of activators may be used.

The amount of activator used varies somewhat with the choice of peroxide initiator, activator, choice of emulsifying agent, and with the particular unsaturated monomers involved. Usually an amount within the range of about 0.05 to 3 percent by weight of activator based on weight of the mixture of monomers will be sufficient.

Copolymerization is usually conducted at temperatures below about 80° C., preferably within the range of 20° to 70° C., although slightly lower and somewhat higher temperatures are permissible. During polymerization, the temperature can be controlled in part through the rate at which monomers are supplied and polymerized and/or through applied cooling.

The polymerization process can be carried out batchwise or continuously. It is possible to work entirely batchwise, emulsifying the entire charge of monomers and proceeding with polymerization. It is usually advantageous, however, to start with part of the monomers which are to be used and add more monomers as polymerization proceeds. An advantage of gradual addition of monomers lies in reaching a high solids content with optimum control and with maximum uniformity of product. Additional catalyst or additional components of the redox system may also be added as polymerization proceeds.

With the attainment of desired polymer content in good yield, the latex is preferably rendered mildly alkaline by adding ammonia or a water-soluble amine such as morpholine or diethylamine.

In some instances, it may be desired to make an adjustment of the viscosity of the alkaline latex by adding a small amount (0.1 to 5 percent) of a thickening agent such as methyl cellulose, hydroxyethyl cellulose. In this way, compensation can be made for possible minor variations in viscosity or latex stability from batch to batch suspensions.

As mentioned above, the acrylic-type monomers are emulsion polymerized in aqueous medium to a high molecular weight thermoplastic product. The principal ingredient of the aqueous medium is deionized water, and constitutes essentially 100 percent of the aqueous medium. The molecular weight of the final product is at least 250,000, usually within the range of about 750,000 to 2,000,000 on a weight average basis as determined by Gel Permeation Chromatography. Usually the solids content of the high molecular weight water-insoluble acrylic latex is within the range of about 30 to 50 percent. By "solids content" is meant the weight of the polymeric product based on total weight of the aqueous latex.

The acrylic polymer as described above is a water-borne, aqueous latex as distinguished from an aqueous solution or aqueous dispersion. An aqueous solution would appear to be optically clear and would not have a polymer particle size to scatter light. An aqueous dispersion, on the other hand, would scatter light and would have a polymer particle size of about 0.01 to 0.09 microns. The aqueous latices employed in the practice of the present invention have micell particle sizes on the order of 0.1 to 1.0 microns.

Besides the high molecular weight water-insoluble acrylic latex, the aqueous composition of the present invention also includes a carboxylated polyether. The carboxylated polyether of the present invention is formed from reacting and then hydrolyzing:

(1) a polyepoxide having an epoxide equivalency greater than 1, (2) a compound containing at least one phenolic hydroxyl group and containing at least one group hydrolyzable to a carboxyl group.

The polyepoxide can be any monomeric or polymeric compound or mixture of compounds having a 1,2-epoxy equivalency greater than 1, that is, in which the average number of 1,2-epoxy groups per molecule is greater than 1. It is preferred that the epoxy compound be polymeric having a molecular weight within the range of 400 to 10,000. Examples of polyepoxides have, for example, been described in U.S. Pat. Nos. 2,467,171; 2,615,007; 2,716,123; 3,030,336; 3,053,855 and 3,075,999.

A preferred class of polyepoxides are the polyglycidyl ethers of polyphenols, such as Bisphenol A. These may be produced, for example, by etherification of a polyphenol with epichlorohydrin or dichlorohydrin in the presence of an alkali. The phenolic compound may be a 1,1-bis(4-hydroxy-phenyl)ethane, 1,1-bis(4-hydroxy-phenyl)isobutane, 2,2-bis(4-hydroxy-tertiary-butyl-phenyl)propane, bis(2-hydroxy-naphthyl)methane, 1,5-dihydroxynaphthalene, 1,1-bis(4-hydroxy-3-allyl-phenyl)ethane, or the like. Another quite useful class of polyepoxides are polyglycidyl ethers produced by etherification of a novolak resin with an epihalohydrin as described above.

Also suitable are the similar polyglycidyl ethers of polyhydric alcohols which may be derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, 2,2-bis(4-hydroxy-cyclohexyl)propane, and the like.

There can also be employed polyglycidyl esters of polycarboxylic acids which are produced by the reaction of epichlorohydrin or similar epoxy compound with an aliphatic or aromatic polycarboxylic acid, such as oxalic acid, succinic acid, glutaric acid, terephthalic acid, 2,6-naphthalene dicarboxylic acid, dimerized linoleic acid, and the like. Examples are diglycidyl adipate and diglycidyl phthalate.

Also useful are polyepoxides derived from the epoxidation of an olefinically unsaturated alicyclic compound. Included are diepoxides comprising, in part, one or more monoepoxides. These polyepoxides are non-phenolic and obtained by epoxidation of alicyclic olefins, for example, by oxygen and by selected metal catalysts, by perbenzoic acid, by acid aldehyde monoperacetate or by peracetic acid. Among the polyepoxides are the epoxy alicyclic ethers and esters which are well known in the art.

The compositions of the instant invention are produced by reacting the polyepoxide, such as described above, with a material containing at least one phenolic hydroxyl group and containing at least one group hydrolyzable to a carboxyl group. The materials to be reacted with the polyepoxide are of the formula:

$$(HO)_n - R - (W)_m$$

where n and m are integers of at least one, and preferably 1 to 4; R is an organic radical containing at least one aryl group and wherein at least one of the hydroxyl groups is attached to at least one of the aryl groups of R. W is a group hydrolyzable to a carboxyl group and is preferably selected from the group consisting of —COOR′, —CON(R″)$_2$ and —CN, where R′ is generally a lower alkyl group of from 1 to 4 carbon atoms, and R″ is selected from the group consisting of hydrogen, lower alkyl (containing from 1 to 4 carbon atoms) and mixtures thereof. The aryl group may have other groups attached thereto so long as such groups do not interfere with the reaction of the hydroxy groups with the epoxy groups. Such materials include alkyl esters of hydroxybenzoic acid, such as methyl, ethyl, isopropyl and butyl-para-hydroxybenzoates; methyl, ethyl, isopropyl and butyl-meta-hydroxybenzoates; methyl, ethyl, isopropyl and butyl-ortho-hydroxybenzoates; para-hydroxybenzamide; N,N-dimethyl-para-hydroxybenzamide; N-ethyl-para-hydroxybenzamide; N,N-dibutyl-para-hydroxybenzamide; ortho-hydroxybenzonitrile; meta-hydroxybenzonitrile; para-hydroxybenzonitrile; phenolphthalein and related compounds; and the like.

Useful materials also include compounds of the formula:

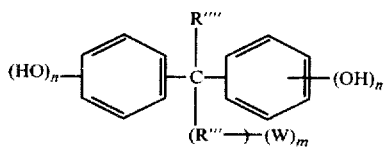

where n, m and W are defined as above, where R‴ is a divalent organic radical, and where R⁗ is selected from the group consisting of H and lower alkyl groups (that is, containing from 1 to 4 carbon atoms). Specifically usable materials include the alkyl esters of 4,4-bis(-para-hydroxyphenyl)pentanoic acid (also known as diphenolic acid), and the like.

In general, the equivalent ratio of epoxy groups contained in the polyepoxide to phenolic hydroxyl groups contained in the compound containing at least one group hydrolyzable to a carboxyl group should be between 1.0:0.2–1.3 and preferably 1.0:0.5 to 1.0. Also, it is preferred that the carboxyl content of the reaction product be at least equivalent to an acid value (on solids basis) of at least 15, preferably between 20 to 25, when in an unneutralized state.

In reacting the polyepoxide and the hydrolyzable group-containing, phenolic hydroxyl-containing material, a catalyst may be used if desired. Suitable catalysts include benzyldimethylamine, benzyltrimethylammonium hydroxide, ethyltriphenylphosphonium iodide, triethylamine, as well as various other tertiary amines known in the art, and Lewis-acid type catalysts such as zinc chloride, boron trifluoride, hydrogen chloride, and the like. In general, where catalysts are employed, they should be used in amounts from 0.01 to 3.0 percent by weight based on total weight of the epoxy-containing material and the hydrolyzable group-containing, phenolic hydroxyl-containing material. Usually it is desirable to react the components at elevated temperatures, and for this purpose, temperatures of from 110° C. to 225° C. are generally acceptable. Of course, it is to be recognized that the reaction temperature can be varied between about the lowest temperature at which the reaction reasonably proceeds and the temperature indicated above.

A solvent is not necessary, although one is often used in order to afford better control of the reaction. The solvent used should be non-reactive with the reactive ingredients, particularly the polyepoxide. Useful solvents include methyl isobutyl ketone, dioxane, the monoalkyl ethers of ethylene glycol known as CELLOSOLVES, xylene, toluene and the like. If desired, a coupling solvent can be added for improved deposited film appearance. These solvents include hydrocarbons, alcohols, esters, ethers and ketones. Specific coupling solvents include isopropyl alcohol, n-butanol, isophorone, 4-methoxy-4-methyl-2-pentanone, ethylene and propylene glycol, the monoalkyl ethers of ethylene glycol, and 2-ethyl hexanol. In general, the coupling solvent, when used, is added after the reaction between the epoxy and the hydrolyzable group-containing, phenolic hydroxyl-containing material is complete.

The reaction between the epoxy-containing material and the hydrolyzable group-containing, phenolic hydroxyl-containing material yields a product effectively containing blocked carboxyl groups, which, upon hydrolysis and solubilization, yield solubilized products. The reactions involved are believed to occur as follows:

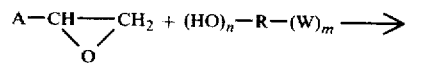

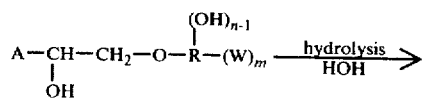

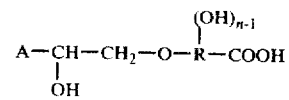

In the above reaction, A represents an organic radical.

For hydrolyzing, the reaction products may be heated to a suitable temperature in the presence of high pressure steam. After hydrolysis, the products can be solubilized with aqueous base. In a preferred embodiment, the compositions are hydrolyzed in the presence of an aqueous base solution, thereby producing a solubilized product in one step.

Suitable solubilizing agents include inorganic bases such as metal hydroxides, as well as organic bases, such as ammonia, amines or quaternary ammonium compounds. Among the amines which may be used are alkyl amines, such as ethyl amine, propyl amine, dimethyl amine, dibutyl amine, cyclohexyl amine, and the like; allyl amine, alkanol amines, such as ethanolamines and the like; aralkyl amines, such as benzoyl amine; alkaryl amines, such as m-toluidine; cyclic amines, such as morpholine and piperidine; diamines such as hydrazine, ethyl diamine, and the like. Mixtures of solubilizing agents may also be used. The solubilization reaction can be accomplished by mixing the solubilizing base with the hydrolyzed reaction product. Most preferably, however, an aqueous solution of the base is used and such aqueous solution is blended with the unhydrolyzed product. If desired, moderately elevated temperatures can be employed. Essentially any amount of solubilizing agent may be used as long as the desired degree of water solubility is obtained. In general, the amount of solubilizing agent will be dependent upon both the acid value, amount of ether groups in the reaction product, and on the fact that when the solubilized carboxylated polyether is combined with the acrylic latex, a stable mixture is obtained. In considering that the acid value of the carboxylated polyether (in the unneutralized state) should be at least 15 and preferably between 20 to 25 as described above, suitably solubilized products can be obtained by neutralizing to at least 50 percent and preferably 80 to 100 percent of the total theoretical neutralization.

In some instances, it has been found that hydrolysis and solubilization of the reaction products disclosed herein using an aqueous amine solution is a slow reaction. It has also been found that the solubilization reaction using an aqueous amine solution does not always result in a fully hydrolyzed or saponified product. Accordingly, it is desirable in some instances to first solubilize the product using an aqueous metal hydroxide solution, for example, sodium or potassium hydroxide. The resultant solubilized product is then reacted with an acid, such as phosphoric acid or sulfuric acid. The resultant product then contains carboxyl groups and the salt form is precipitated and filtered off. The carboxyl-containing product may then be readily solubilized by reaction with an amine.

The aqueous compositions of the invention can be prepared from one or mixture of acrylic latices and from one or a mixture of solubilized carboxylated polyethers. Usually the carboxylated polyether is slowly added to the acrylic latex with agitation to form the desired composition. For desirable coating properties having a balance of good adhesion and good moisture barrier properties, the aqueous compositions of the invention should contain from 20 to 80 and preferably 20 to 50 percent by weight of the acrylic latex and 20 to 80, preferably 50 to 80 percent by weight of the solubilized carboxylated polyether; the percentages by weight being based on total weight (solids) of acrylic latex and carboxylated polyether.

The mixture of components should be a stable, alkaline emulsion having any desired resin solids content, but preferably having a resin solids content of 20 to 50 and preferably 30 to 40 percent. By resin solids content is meant solids based on water-insoluble acrylic latex and carboxylated polyether.

The compositions of the present invention can contain up to 50 percent by weight of optional ingredients such as pigments, fillers, extenders, plasticizers, viscosity modifiers or other resinous components which are present to modify film properties; the percentage by weight being based on total weight of optional ingredients, acrylic latex solids and carboxylated polyether solids.

In most instances, the compositions of the present invention are pigmented. Examples of suitable pigments include titanium dioxide, aluminum silicate, talc, carbon black, zinc oxide, barium or strontium chromates, iron oxides, lead oxides, as well as color pigments, such as cadmium yellow, cadmium red, chromium yellow and mixtures of pigments. When employing pigmented coatings, pigmentations of up to 50 percent by weight and preferably 25 to 40 percent by weight based on total weight of pigment, acrylic latex (solids) and carboxylated polyether (solids) are usually employed.

It will be appreciated that the aqueous compositions of the present invention can contain small amounts (for example, up to about 15 percent by weight based on total solvent weight) of organic solvents, the latter usually representing solvents added to the acrylic latex either during or after emulsion polymerization or added in the preparation of the carboxylated polyether. These solvents should be selected so that they will not adversely affect the rheological qualities or drying rates of applied films or the film continuity. Hydrocarbon solvents are generally preferred, although stable (not reactive) ester, ketone, ether, ether-ester, nitro-aliphatic and other types can be used.

As mentioned above, the aqueous composition is alkaline, however, the pH can be further raised by the addition of alkaline materials, preferably amines, to secure a pH best suited to the application method used in applying a film of the finished emulsion to the substrate. A pH between about 7.5 and 9 is generally used. The pH can be particularly helpful in promoting compatibility of the various components in the coating composition.

A packaged emulsion can be thinned with water just prior to use where it is convenient to package the emulsion at higher solids contents than are best suited for a particular use or method of application. At the time of application, the solids content of the finished emulsion can be brought into the desired range.

The coating compositions of the present invention may be applied to all sorts of surfaces for a wide variety of purposes. The composition can be applied by any coating method including brushing, spraying, dipping and flow coating. The coatings are particularly desirable for application to surfaces of metal, such as iron, steel, copper, brass, aluminum, chromium, nickel and the like, and can be used for adherence to glass, porcelain and other vitreous materials.

Compositions of the present invention are of particular utility when used as primers in a coil coating operation for galvanized steel. They provide an excellent moisture barrier to the galvanized steel when the steel is topcoated with an acrylic emulsion polymer. The degree of adhesion between the coatings of the present invention and steel and the acrylic topcoat is excellent.

After the coating composition has been applied, it is dried by any conventional drying technique such as microwave drying or even baking. Baking is carried out at temperatures of 150 to 450° C. for periods of time of at least 10 seconds. Dry coating thickness varies depending on the coating composition and drying conditions. Usually dry coating thickness will be about 0.2 to 0.5 mil.

As has been mentioned above, the aqueous coating compositions can be applied as primer films. After the primer films have been dried, a topcoat can be applied in a superimposed fashion over the primer film. With the aqueous compositions of the present invention deposited as primer films, higher molecular weight emulsion polymerized acrylics make particularly good topcoats. These acrylics are of the type generally described above and may optionally contain a crosslinking agent such as a melamine resin. After the topcoat has been applied, it is dried by conventional means such as described above. Usually the topcoat is thicker than the primer coat and drying usually takes a little longer. Topcoat thicknesses usually range from 0.5 to 1.0 mil.

The invention will be further described in connection with several examples which follow. These examples are given as illustrative of the invention and are not to be construed as limiting it to their details. All parts and percentages in the examples, as well as throughout the specification, are by weight unless otherwise indicated.

EXAMPLE I

Part A — Carboxylated Polyether

A carboxylated polyether formed from reacting and then hydrolyzing a polyepoxide having an epoxide equivalency greater than one was prepared from the following charge:

| Charge | Parts by Weight |
|---|---|
| para-hydroxy methyl benzoate | 22.0 |
| Bisphenol A | 100.0 |
| EPON 829[1] | 200.0 |
| ethylene glycol monobutyl ether | 173.4 |
| KOH pellets | 8.0 |
| deionized water | 8.0 |
| phosphoric acid | 16.4 |
| dimethyl ethanolamine | 9.7 |
| deionized water | 421.0 |

[1]Epoxy resin solution made from reacting epichlorohydrin and Bisphenol A, having an epoxy equivalent of approximately 193-203, commericially available from Shell Chemical Company.

The para-hydroxy methyl benzoate, Bisphenol A and EPON 829 were charged to a suitable reaction vessel and heated to 177° C. and held at this temperature for one hour. The ethylene glycol monobutyl ether was then added and the reaction mixture cooled to 99° C. The KOH pellets were dissolved in the first portion of deionized water and this solution added to saponify the methyl ester. Phosphoric acid was then added to neutralize the potassium salt, and the reaction mixture filtered to remove the potassium phosphate. The filtrate was then solubilized with the dimethyl ethanolamine and thinned with the second portion of deionized water to form a 32.5 percent solids solution having a Gardner-Holdt viscosity (measured at 23° C.) of Z-. The product had an acid value of 6.6 and a pH of 8.5.

Part B — Acrylic Latex

A high molecular weight acrylic latex was prepared from the following charge:

| Charge | Parts by Weight |
|---|---|
| glacial acrylic acid | 30.33 |
| dimethyl ethanolamine | 27.22 |
| deionized water | 2340.38 |
| sodium laural sulfate | 24.40 |
| 2-ethyl hexyl acrylate | 499.80 |
| styrene | 378.69 |
| methyl methacrylate | 605.75 |
| sodium bicarbonate | 1.85 |
| ammonium persulfate | 5.63 |

The acrylic acid was charged to a reaction vessel and heated to 82° C. with agitation. The deionized water was added slowly followed by the addition of the sodium laural sulfate. The 2-ethyl hexyl acrylate was added slowly, with the temperature of the reaction vessel being maintained between 77°-82° C. The addition of the 2-ethyl hexyl acrylate was extended over a period of five hours. After 2-¼ hours into the addition, the styrene addition was started and completed over a period of 2-¼ hours. After the addition of the 2-ethyl hexyl acrylate and the styrene, the methyl methacrylate, sodium bicarbonate and ammonium persulfate were charged to the reaction vessel, and the reaction mixture held for one hour at 77°-82° C. The reaction mixture was then neutralized with dimethyl ethanolamine to adjust the pH to 8.5 to 9.0. The latex had a solids content of 38.9 percent, a viscosity of 600 centipoises measured at 23° C., 20 revolutions per minute using a No. 3 spindle. The acid value of the latex was 6.96. The molecular weight of the acrylic polymer was about 1,000,000 on a weight average basis as determined by Gel Permeation Chromatography.

Part C — Pigment Grind

A pigment grind was formed from the following charge:

| Ingredient | Parts by Weight |
|---|---|
| diethylene glycol monobutyl ether | 29.96 |
| deionized water | 9.99 |
| dimethyl ethanolamine | 4.99 |
| ACRYSOL I-94[1] | 24.97 |
| L-475[2] | 2.00 |
| strontium chromate | 29.96 |
| titanium dioxide | 119.84 |

[1]Copolymer of butyl acrylate, methyl methacrylate, styrene and acrylic acid sold commerically by Rohm and Haas Company as a pigment dispersant.
[2]Liquid defoamer sold commerically by Drew Chemical.

The charge was ground in a sand mill to a Hegman 7.5. 251.67 parts by weight of the pigment grind was then thinned with 29.96 parts of deionized water to form a paste.

Part D — Coating Formulation

A coating formulation was prepared from the following charge:

| Charge | Parts by Weight |
|---|---|
| carboxylated polyether of Part A | 501.22 |
| acrylic latex of Part B | 167.78 |
| deionized water | 49.94 |
| pigment paste of Part C | 251.67 |

The carboxylated polyether, the acrylic latex and the deionized water were charged to a reaction vessel and the pigment paste was added slowly under agitation. The resulting composition had a total resin solids content of 40.1 percent. When applied to a galvanized steel surface and baked at 121°-135° C. for 60 seconds, the composition formed an excellent moisture resistant primer coating. When topcoated with a high molecular weight acrylic latex sold commercially by Rohm and Haas Company under the trade name AC 658 (butyl acrylate-acrylic acid-methyl methacrylate copolymer), excellent adhesion was developed between the topcoat and the primer coating when the topcoat was cured at about 260° C. for 80 seconds.

COMPARATIVE EXAMPLE

For purposes of comparison, an aqueous composition of the present invention containing a high molecular weight, water-insoluble acrylic polymer and a carboxylated polyether was compared with two other aqueous coating compositions, one of which contained a low molecular weight water-dispersible acrylic in combination with a carboxylated polyether and the second of which contained 10 percent by weight of a melamine-formaldehyde crosslinker in addition to the low molecular weight acrylic and carboxylated polyether.

The aqueous coating composition of the invention, designated as Composition E in the table below, contained about 37 percent resin solids and was prepared from the following charge:

| Ingredient | Parts by Weight |
|---|---|
| Carboxylated polyether prepared as described in Example I-A | 63 |
| High molecular weight water-insoluble acrylic polymer prepared as described in Example I-B | 54.2 |
| Pigment paste[1] | 45.0 |

The first comparative aqueous coating composition designated as Composition F in the table below contained about 31 percent resin solids and was prepared from the following charge:

| Ingredient | Parts by Weight |
|---|---|
| Carboxylated polyether prepared as described in Example I-A | 63.5 |
| Low molecular weight water-dispersible acrylic[2] | 67.3 |
| Pigment paste[1] | 45.0 |
| Dimethyl ethanolamine | 0.5 |

| Ingredient | Parts by Weight |
|---|---|
| —continued | |
| Deionized water | 28.0 |

The second comparative aqueous coating composition designated as Composition G in the table below contained about 31 percent resin solids and was prepared from the following charge:

| Ingredient | Parts by Weight |
|---|---|
| Carboxylated polyether prepared as described in Example I-A | 57.1 |
| Low molecular weight water-dispersible acrylic[2] | 60.6 |
| Pigment paste[1] | 45 |
| Dimethyl ethanolamine | 0.5 |
| Deionized water | 25.0 |
| MM-83[3] | 5.0 |

[1]Pigment paste prepared from the following charge:

| Ingredient | Parts by Weight |
|---|---|
| Diethylene glycol monobutyl ether | 26.0 |
| Deionized water | 132.5 |
| Dimethyl ethanolamine | 6.5 |
| ACRYSOL I-94[a] | 143.0 |
| L-475[b] | 5.0 |
| Strontium chromate | 60.0 |
| Titanium dioxide | 240.2 |

[a]Copolymer of butyl acrylate, methyl methacrylate, styrene and acrylic acid sold commerically by Rohm and Haas as a pigment dispersant.
[b]Liquid defoamer sold commericially by Drew Chemical. The charge was ground in a Zircoa mill to a Hegman 7+.
[2]The low molecular weight water-dispersible acrylic polymer was formed by polymerizing 33 percent by weight of 2-ethyl hexyl acrylate, 25 percent by weight styrene, 36 percent by weight methyl methacrylate and 6 percent by weight acrylic acid to a weight average molecular weight of about 100,000 and solubilizing with dimethyl ethanolamine.
[3]MM-83 is a crosslinker commercially available from Rohm and Haas Company and believed to be an 80 percent solids solution in isopropyl alcohol of a melamine-formaldehyde condensate partially alkylated with isopropyl alcohol.

BONDERITE ®1303 pretreated, hot dipped, galvanized steel panels (25 mils in thickness) were coated with the compositions disclosed above by drawing down with wire-wrapped draw bars and baked for 30 seconds at 500° F. (260° C.) to form primer coatings of about 0.3 mil in thickness.

The primer coated panels were then topcoated with a high molecular weight acrylic latex which was a blend in a 2:1 ratio (based on solids) of two high molecular weight acrylic latices commercially available from Rohm and Haas under the trade names AC-658 and AC-604, respectively. Both materials were butyl acrylate-acrylic acid-methyl methacrylate copolymers. The topcoat was cured at 500° F. (260° C.) for about 75 seconds to form topcoats of about 0.7 mil thickness.

The topcoated panels were then evaluated for flexibility, humidity, salt spray and solvent resistance. The results of the testing are reported in Table I below.

Table I

Performance Ratings on Coated Panels

| Test | | Compositions | | |
|---|---|---|---|---|
| | | E | F | G |
| Flexibility | | | | |
| | 4T Bend[1] | 0 | 2 | 1 |
| | Dry Heat[2] | 3 | 4 | 4 |
| | 40 in.-lb. reverse impact[3] | 5 | 5 | 6 |
| Humidity[4] | | | | |
| | Hardness[5] Pencil | | | |
| | Before Exposure | 2H | 2H | 2H |
| | After Exposure | 4B | <6B | 6B |
| | 3-day Recovery | 2H | B | 2H |
| | Adhesion (Nickel)[6] | | | |
| | Before Exposure | | | |
| | Primer to Substrate | excellent | excellent | excellent |
| | Topcoat to Primer | good | fair | good |
| | After Exposure | | | |
| | Primer to Substrate | fair | fair | fair |

Table I-continued

Performance Ratings on Coated Panels

| Test | | Compositions | | |
|---|---|---|---|---|
| | | E | F | G |
| | Topcoat to Primer 3-day Recovery | fair | very poor | poor |
| | Primer to Substrate | excellent | good | excellent |
| | Topcoat to Primer | good | very poor | good |
| Salt Spray[7] | Face Corrosion/Adhesion | 9/8 | 9/5 | 9/7 |
| | Bend Corrosion/Adhesion | 8/6 | 6/7 | 5/7 |
| | Cut Edge Corrosion/Adhesion | 8/7 | 8/6 | 7/6 |
| | Scribe Corrosion/Adhesion | 8/5 | 8/6 | 6/7 |
| | Composite Protection[8] | 82% | 76% | 75% |
| Solvent Resistance[9] | | 30 | 2 | 36 |

[1] A procedure for determining the T-bend is as follows:
(1) The coated panel to be tested should be 2 inches by 5 inches with a 2-inch edge parallel to the grain of the metal.
(2) Insert the 2-inch edge approximately one-half inch into the jaws of a vice suitable for bending and clenching the test panel without marring the painted surface. The coated surface faces away from the operator.
(3) Tighten the vice.
(4) Use fingertips, fold the metal panel towards the operator to make approximately a 90 degree bend.
(5) Remove the panel from the vice and complete the bend with the fingers. This is a 0T bend.
(6) Reinsert the panel in the vice approximately 1/4 inch with coated surface facing away from the operator.
(7) Tighten vice.
(8) Repeat steps (4) through (7). This is a 1T bend. Steps (4) through (7) are repeated until a 4T bend is attained.
(9) Press a strip of SCOTCH brand cellophane tape No. 600 firmly across the bend and pull off sharply.
(10) Using a 5 to 10 power magnifying lens, inspect the bend and evaluate for cracking and pick-off. The ratings range from 0 to 9, with 0 being perfect, that is, no cracking or pick-off being observed.
[2] The flexibility of the coatings in dry heat is obtained by subjecting the coated substrate to a 4T bend and then exposing the substrate to 180° F. (82° C.) for 35 minutes at a very low relative humidity of about 10 to 15 percent. Ratings, once again, range from 0 to 9 with 0 being perfect, that is, no cracking or pick-off being observed after bending and exposure to dry heat.
[3] The reverse impact test was measured on a Gardner Impact Tester. The panels were subjected to 40 inch-pounds of reverse impact, i.e., the side being impacted was the opposite of the coating side. A strip of SCOTCH brand cellphane tape No. 600 was pressed firmly across the bump in the coated surface and pulled off sharply. Using a 5 to 10 power magnifying lens, the bump was inspected for cracking and pick-off. Ratings ranged from 0 to 10 with 0 being perfect.
[4] For Hardness and Adhesion evaluation, the coated panels were measured before and after exposure for 1000 hours in a relative humidity cabinet at 100° F. (38° C.) and 100 percent relative humidity.
[5] The pencil hardness is determined by taking a series of standard pencils of varying hardness with H being the hardest and B the softest and scratching the coated panels with pencils of increasing hardness until the coating was etched away. The hardest pencils were the H and the higher the number before the letter H, the harder the pencil in that particular classification, for example, a 2H pencil would be harder than a 1H pencil. With the B pencils, the higher the number, the softer the pencil, for example, a 6B pencil would be softer than a 4B pencil. Hardness values were taken before, immediately after 3 days after the humidity exposure.
[6] The nickel adhesion test is determined by taking a new nickel and scraping the coating with the nickel to determine how firmly the coating is adhered. The adhesion before, immediately after and 3 days after the humidity exposure is reported in the table.
[7] The salt spray exposure testing is done by placing the coated samples in a salt fog cabinet and subjecting them to a salt spray as defined by ASTM B-117-62 for 1000 hours. The corrosion as well as the adhesion of the coatings to the panels is then measured. The corrosion and adhesion values are given a rating of from 0 to 9 with 9 being perfect. Corrosion and adhesion are evaluated not only for the extent of corrosion and loss of adhesion but also for intensity. The corrosion and adhesion values on the face of the panel are self-explanatory. For the Bend values, the panels are bent to about a 5 to 6T and the corrosion and loss of adhesion measured in the area of the bend. The cut edge measurements are determined by cutting the coated panel at its edge and measuring the corrosion at this cut edge. The scribe measurements are made by cutting the scribe across the coated surface of the panel with a razor blade and measuring the corrosion and adhesion along the scribe line.
[8] The composite protection is an average value of the corrosion and adhesion of the face, bend, cut edge and scribe areas assuming that 9 is perfect with no corrosion or loss of adhesion evidence.
[9] The solvent resistance is measured by rubbing the coated samples with a methyl ethyl ketone saturated cloth. The coated substrates are rubbed with double rubs until the coating is removed.

I claim:

1. A method of producing a multiple layer coating on a substrate comprising:
   (A) depositing on a substrate a film of a primer formed from an aqueous composition comprising a mixture of:
   (1) a water-borne acrylic polymer latex in which the acrylic polymer has a molecular weight of at least 250,000 on a weight average basis and which is composed of 35 to 100 percent by weight of esters or organic acids having terminal methylene groups, 0 to 10 percent by weight of unsaturated carboxylic acids and 0 to 60 percent by weight of a copolymerizable monomer containing a $CH_2=C$ group in the terminal position other than the acids and esters mentioned above, the percentage by weight being based on total weight of the monomer charge;
   (2) a carboxylated polyether formed from reacting and then hydrolyzing:
   (a) a polyepoxide having an epoxide equivalency greater than 1.0,
   (b) a compound containing at least one phenolic hydroxyl group and containing at least one group hydrolyzable to a carboxyl group;
   (B) drying said primer film;
   (C) applying over said primer a superimposed topcoat composition.

2. The method of claim 1 in which the topcoat is a high molecular weight acrylic polymer.

3. The method of claim 2 in which the substrate is metal.

4. The method of claim 3 in which the metal is galvanized steel.

5. The method of claim 2 in which the primer film is dried by baking at a temperature of 150° to 450° C.

6. The coated article produced by the method of claim 2.

7. The coated article produced by the method of claim 4.

* * * * *